W. G. LANDON.
VALVE GEAR FOR LOCOMOTIVES.
APPLICATION FILED APR. 4, 1912.
1,047,420.
Patented Dec. 17, 1912.
3 SHEETS—SHEET 1.
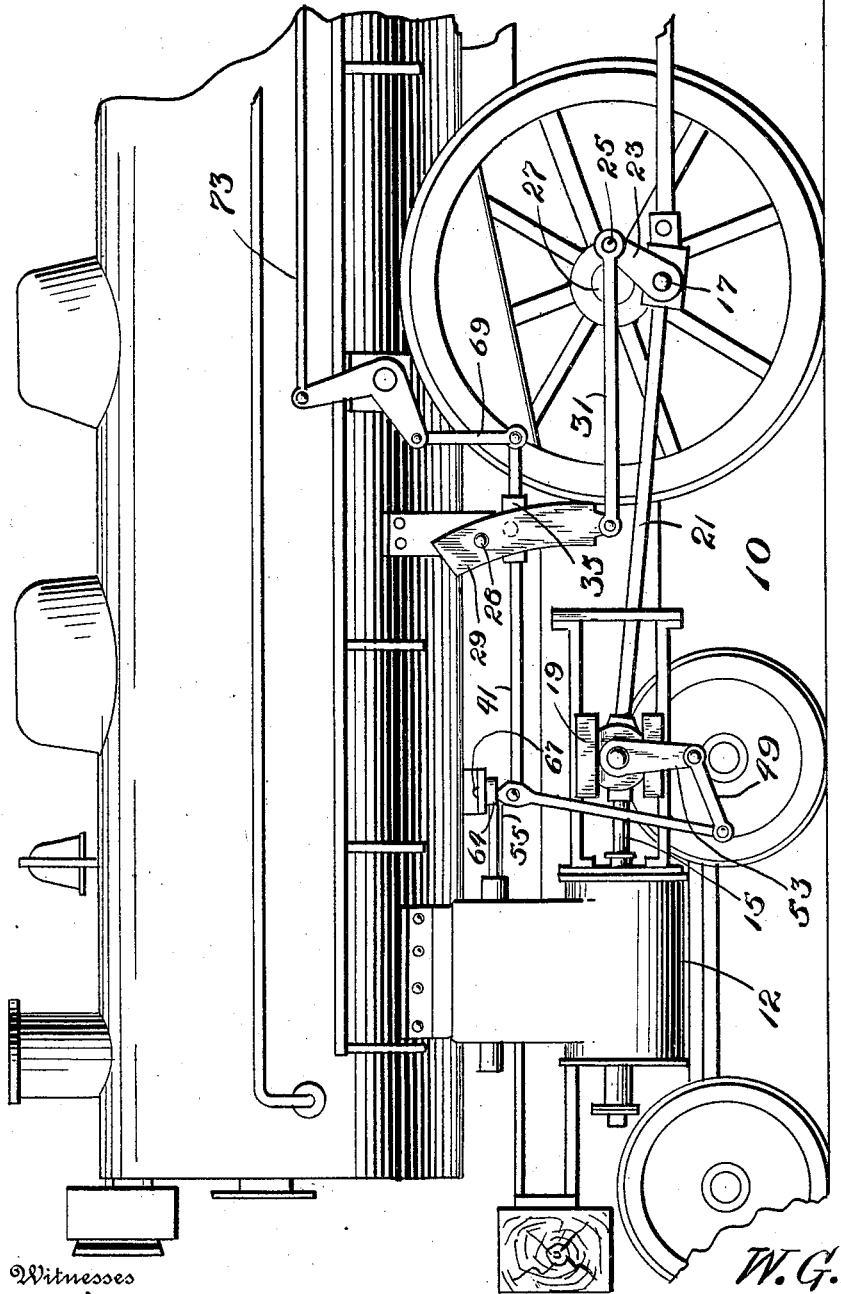

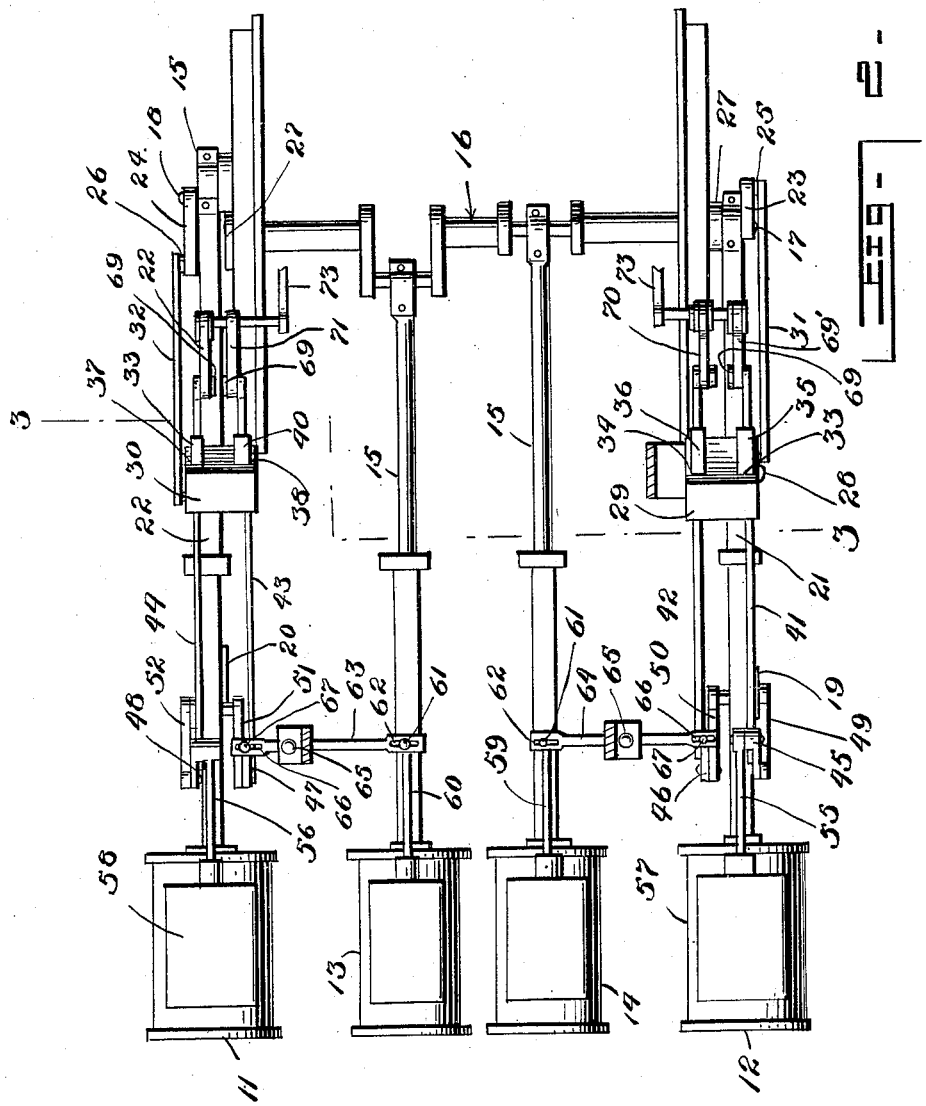

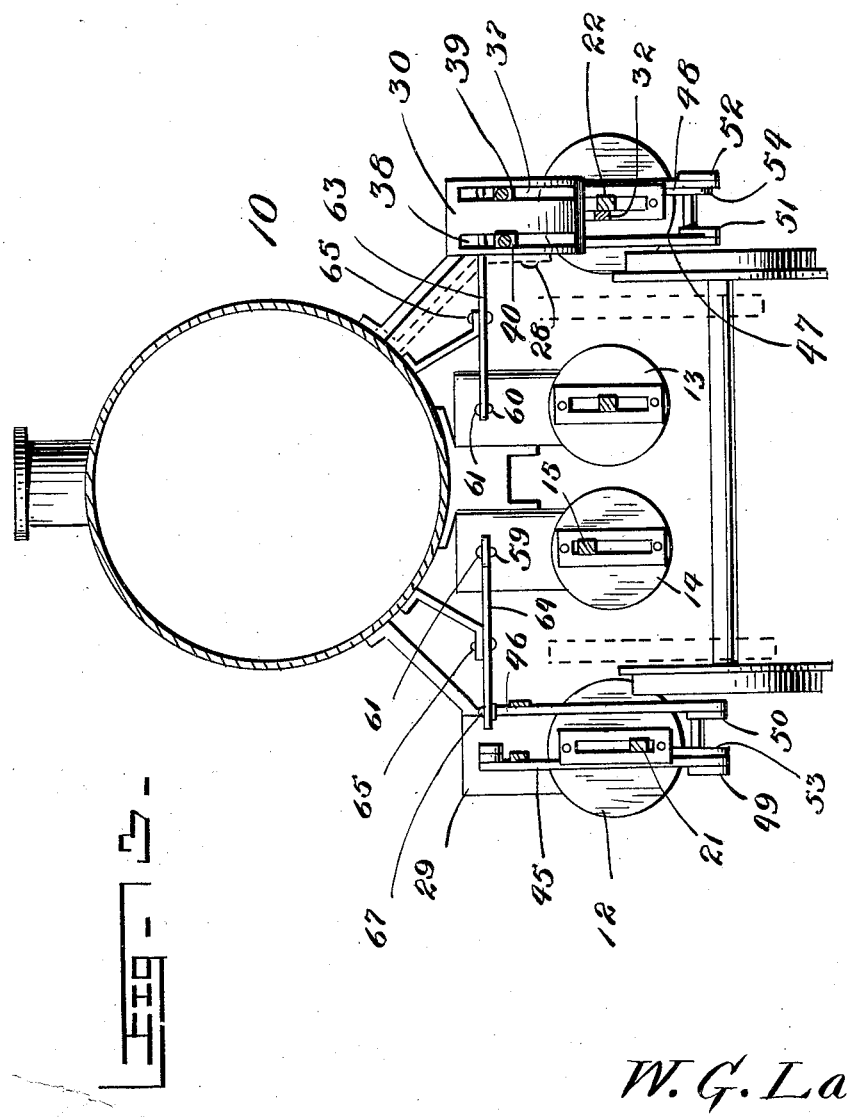

UNITED STATES PATENT OFFICE.

WILLIAM G. LANDON, OF NEW HAVEN, CONNECTICUT.

VALVE-GEAR FOR LOCOMOTIVES.

1,047,420.   Specification of Letters Patent.   Patented Dec. 17, 1912.

Application filed April 4, 1912. Serial No. 688,435.

*To all whom it may concern:*

Be it known that I, WILLIAM G. LANDON, a citizen of the United States, residing at New Haven, in the county of New Haven, State of Connecticut, have invented certain new and useful Improvements in Valve-Gears for Locomotives; and I do hereby declare the following to be a full, clear, and exact description of the invention, such as will enable others skilled in the art to which it appertains to make and use the same.

My invention relates to new and useful improvements in valve gears for four cylinder compound locomotive engines and the object of my invention is to improve the construction and increase the efficiency of valve gears of the above described character.

A further object of my invention is to provide a modified form of Walscheart gear by means of which the valves of both the high pressure and low pressure cylinders may be independently operated by a single valve gear positioned at the outside of the engine and therefore readily accessible for lubrication or repairs.

With these and other objects in view, my invention will be more fully described, illustrated in the accompanying drawings, which show a preferred embodiment of my device and then specifically pointed out in the claims which are attached to and form a part of this application.

In the drawings, Figure 1 is a side elevation of my valve gear applied to a four cylinder compound engine. Fig. 2 is a top plan view of the same. Fig. 3 is a section on the line 2—2 of Fig. 1.

Referring more specifically to the drawings, in which similar reference numerals designate corresponding parts throughout, 10 designates in general the engine frame, 11 and 12 the low pressure cylinders and 13 and 14 the high pressure cylinders of the engine, said cylinders having piston rods 15 operatively connected to a common crank shaft 16, the cranks of the high cylinder and the low cylinder of each pair of cylinders being set 180 degrees with respect to each other while the cranks of each cylinder of one pair are set at 90 degrees to the cranks of the respective cylinders of the other pair as in common practice. Connecting the crank pins 17 and 18 with the cross heads 19 and 20 are the customary pitman rods 21 and 22 and formed integrally with the crank pins are arms 23 and 24 provided with integrally formed pins 25 and 26 which are slightly eccentric to the center point of the drivers which point, is shown at 27.

Pivoted upon trunnions 28 are double box links 29 and 30 the lower ends of which are pivotably connected to eccentric rods 31 and 32, the free ends of said rods being pivoted upon the pins 25 and 26. The box link 29 is grooved as at 33 and 34 to receive the blocks 35 and 36 while the box link 30 is grooved as at 37 and 38 to receive the blocks 39 and 40, the radius of curvature in each case being equal to the length of the respective rods said rods being designated by the numeral 41, 42, 43 and 44 respectively. These rods are connected by one end each to its respective block in the customary manner, and by their other ends to floating levers 45, 46, 47 and 48 respectively, the free ends of said levers being pivotally connected to links 49, 50, 51 and 52. The free ends of the links 49 and 50 are pivotally connected to the free end of an arm 53 of the cross head 19 while the free ends of the links 51 and 52 are pivotally connected to the free end of the arm 54 of the cross head 20.

Pivoted to the upper ends of the floating levers 45 and 47 are the free ends of the valve stems 55 and 56 of the valves 57 and 58 of the high pressure cylinders 11 and 12. The valve stems 59 and 60 of the low pressure cylinders 13 and 14 are provided at their free ends with pins 61 engaging in slots 62 formed in the ends of transmission rods 63 and 64 which are pivoted intermediate their length as at 65 and the other ends of which are slotted as at 66 to receive pins 67 of the floating levers 46 and 47.

As a means for shifting the blocks 35, 36, 39 and 40 I have extended their respective radius rods and connected their free ends by means of links 69 each with one arm of the bell crank levers 69', 70, 71 and 72, the other arms of which are operatively connected by connecting rods 73 with the reverse levers not shown.

From the foregoing description it will be apparent that I have provided each of the valves of the low pressure cylinders with a Walscheart gear and that by providing these gears with double blocks and additional eccentric rods, radius rods and floating levers I have adapted them for use in driving the valves of the high pressure cylinders. These valve gears are operated in each instance in the same manner in which an ordinary Walscheart gear would be operated and the gears operating the valves of the low pressure cylinders act in the usual manner. The gears operating the valves of the high pressure cylinders also operate as in standard practice, the only difference being that instead of applying the movement of the floating levers to the valve stems directly as in the case of the low cylinder valve, said motion is applied indirectly through the pivoted transmission rods 63 and 64, this being necessarily due to the fact that the cranks of the high pressure cylinders are set at an angle of 180 degrees to the cranks of their respective low pressure cylinders. As will be readily seen by this description, valve gears of the Walscheart type may be modified at slight cost to adapt them to actuate the valves of the high pressure cylinders as well as the valves of the low pressure cylinders, thus doing away with the necessity of four complete sets of valve gears. It will further be apparent that when modified as described above both gears will be located at the outside of the engine where they will be readily accessible for lubrication or necessary repairs.

It will of course be understood that I do not wish in any way to limit myself to the specific structure illustrated in the drawings and set forth in the specification as minor changes in details of construction, within the scope of the appended claims, may be made if desired without in the slightest degree departing from the spirit of my invention.

What I claim is:—

1. The combination with an engine having a low pressure cylinder and a high pressure cylinder, separate valve stems for each of said low pressure and high pressure cylinders and a Walscheart gear including a box link operatively connected to the valve stem of the low pressure cylinder, of a second box link formed integrally with the first, a block movable in said second link, radius rod and floating lever connection between said block and the cross head of the engine, connecting means between said floating lever and the valve stem of the high pressure cylinder, and means for shifting said block.

2. The combination with an engine having an even number of low and high pressure cylinders, separate valve stems for said cylinders and a Walscheart gear including a box link operatively connected to the valve stem of one of said low pressure cylinders, of a second box link formed integrally with the first, a block movable in said second link, radius rod and floating lever connection between said block and the cross head of the engine, connecting means between said floating lever and the valve stem of the said high pressure cylinders, and means for shifting said block.

3. The combination with an engine, having a plurality of cylinders, valve stems for said cylinders and a Walscheart gear including a box link operatively connected to the valve stem of one of said cylinders, of a second box link formed integrally with the first, a block movable in said second link, a radius rod secured by one end to said block, a floating lever pivoted by one end to the free end of said rod, a link pivoted by one end to the free end of said lever, an arm carried by the cross head of the engine and pivotally connected at its free end with the free end of said link, connecting means between said floating lever and the valve stem of the other of said cylinders, and means for shifting said block.

4. The combination with an engine, having a plurality of cylinders, valve stems for said cylinders and a Walscheart gear including a box link operatively connected to the valve stem of one of said cylinders, of a second box link formed integrally with the first, a block movable in said second link, radius rod and floating lever connection between said block and the cross head of the engine, a pin carried by said floating lever, a pin carried by the valve stem of the other cylinder, a transmission rod pivoted intermediate its length and having its ends slotted to engage with said pins, and means for shifting said block.

5. In valve gearing for four cylinder compound locomotive engines, the combination with an engine having corresponding numbers of low pressure and high pressure cylinders, valve stems for said cylinders and a Walscheart gear including a box link operatively connected to the valve stem of each low pressure cylinder, of a second box link formed integral with the first, a block movable in said second link, radius rod and floating lever connection between said block and the cross head of the engine, a pin carried by the upper end of said floating lever, a pin carried by the valve stem of each of the high pressure cylinders, a transmission rod pivoted intermediate its length and having its ends slotted to engage with a float lever pin and a valve stem pin, thus coupling or connecting the high and low pressure cylinders in pairs, and means for shifting said block.

In testimony whereof, I affix my signature, in presence of two witnesses.

WILLIAM G. LANDON.

Witnesses:
  ALFRED N. WHEELER,
  JOHN S. FOWLER.

---

Copies of this patent may be obtained for five cents each, by addressing the "Commissioner of Patents, Washington, D. C."